Sept. 25, 1956  F. G. MITCHELL  2,764,277
CONVEYOR FOR LOOSE MATERIALS IN BULK
Filed June 18, 1951  5 Sheets-Sheet 1

FIG.I.

Inventor
F. G. Mitchell
By Watson, Cole,
Grindle & Watson
Attorney

Sept. 25, 1956 F. G. MITCHELL 2,764,277
CONVEYOR FOR LOOSE MATERIALS IN BULK
Filed June 18, 1951 5 Sheets-Sheet 3

Inventor
F. G. Mitchell
By Watson, Cole,
Grindle & Watson
Attorney

Sept. 25, 1956 F. G. MITCHELL 2,764,277
CONVEYOR FOR LOOSE MATERIALS IN BULK
Filed June 18, 1951 5 Sheets-Sheet 4

Inventor
F. G. Mitchell
By Watson, Cole,
Grindle & Watson
Attorney

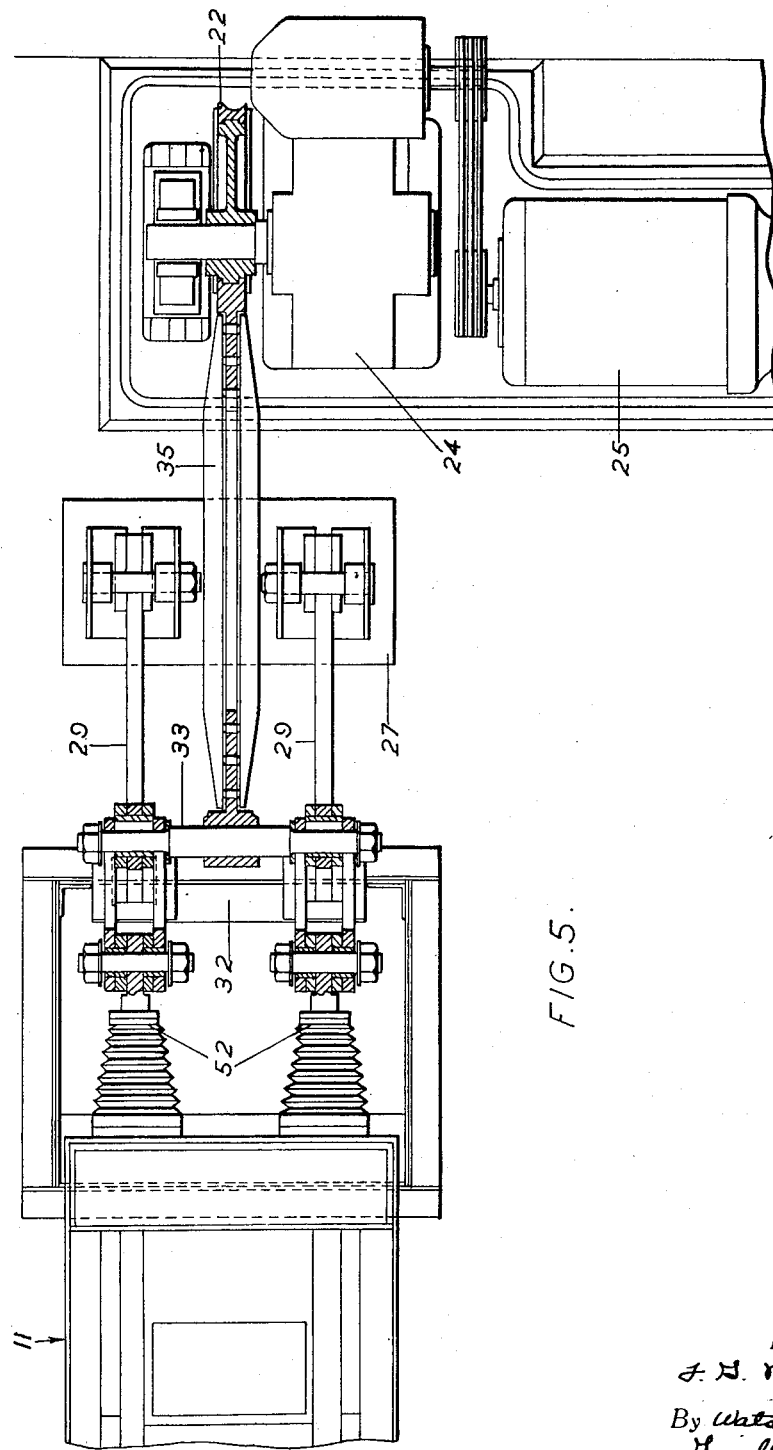

United States Patent Office 2,764,277
Patented Sept. 25, 1956

2,764,277

CONVEYOR FOR LOOSE MATERIALS IN BULK

Frederick Gilbert Mitchell, London, England

Application June 18, 1951, Serial No. 232,123

Claims priority, application Great Britain June 21, 1950

3 Claims. (Cl. 198—218)

This invention relates to conveyors for loose material in bulk, such as ash or clinker.

An object of the invention is to provide a conveyor which, in its elemental form, comprises a track defining a path along which the material is to be conveyed, a pusher mounted for reciprocation in the track parallel therewith, means for feeding the material on to the track ahead of the pusher, and a fixed abutment extending into the track in advance of the pusher and arranged to form a bridge over which the material will be forced by the pusher on its advancing stroke.

In the preferred practical form of the invention the conveyor comprises a set of pushers spaced apart in the length of the track and connected to a reciprocating member movable in the track, combined with a set of bridge-forming abutments whereof the individual elements are located in the gaps between successive elements of the pusher set.

The pushers and bridge-forming abutments are preferably provided with ramped back sloping upwardly from the track, in the forward direction.

An example of a conveyor according to the invention, for handling ash and clinker from a boiler, will now be described with reference to the accompanying drawings in which:

Figure 5 is a plan view of the part of the conveyor shown in Figure 4.

Figure 1:
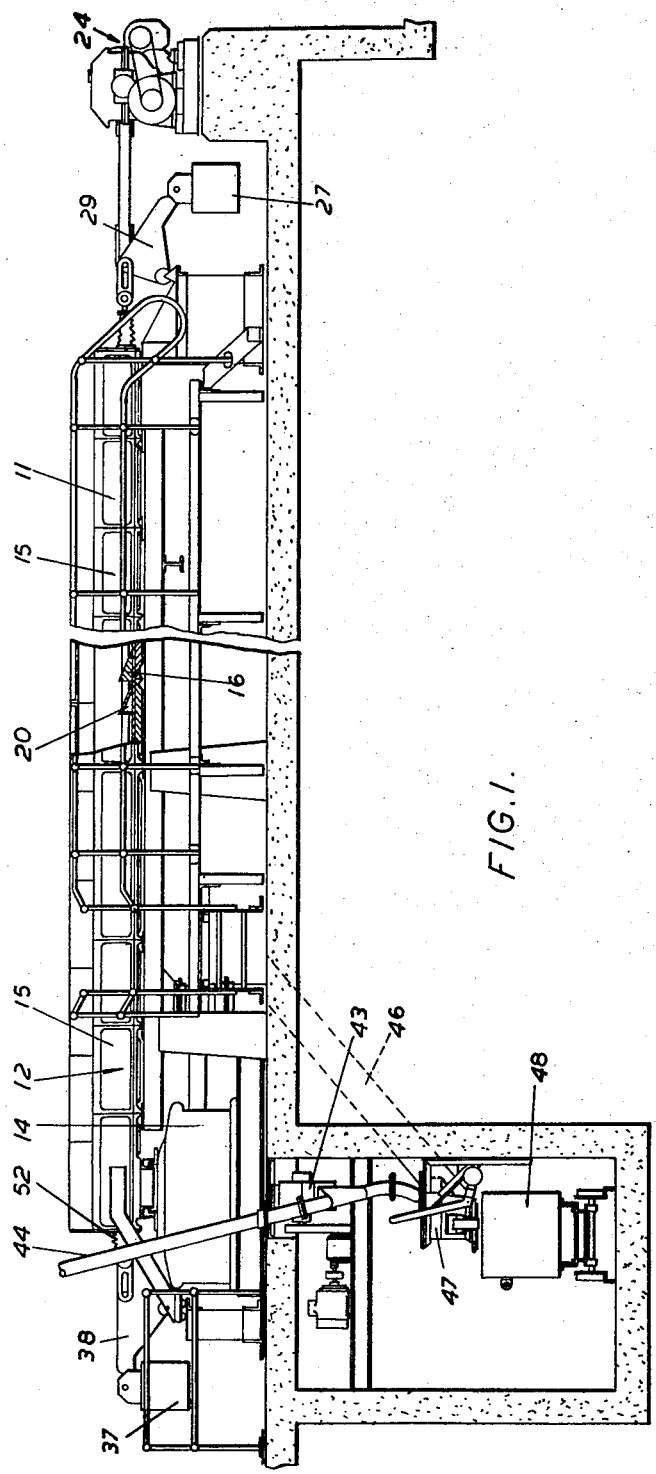
Figure 1 is a side elevation of the conveyor and the associated apparatus.
Figure 2:
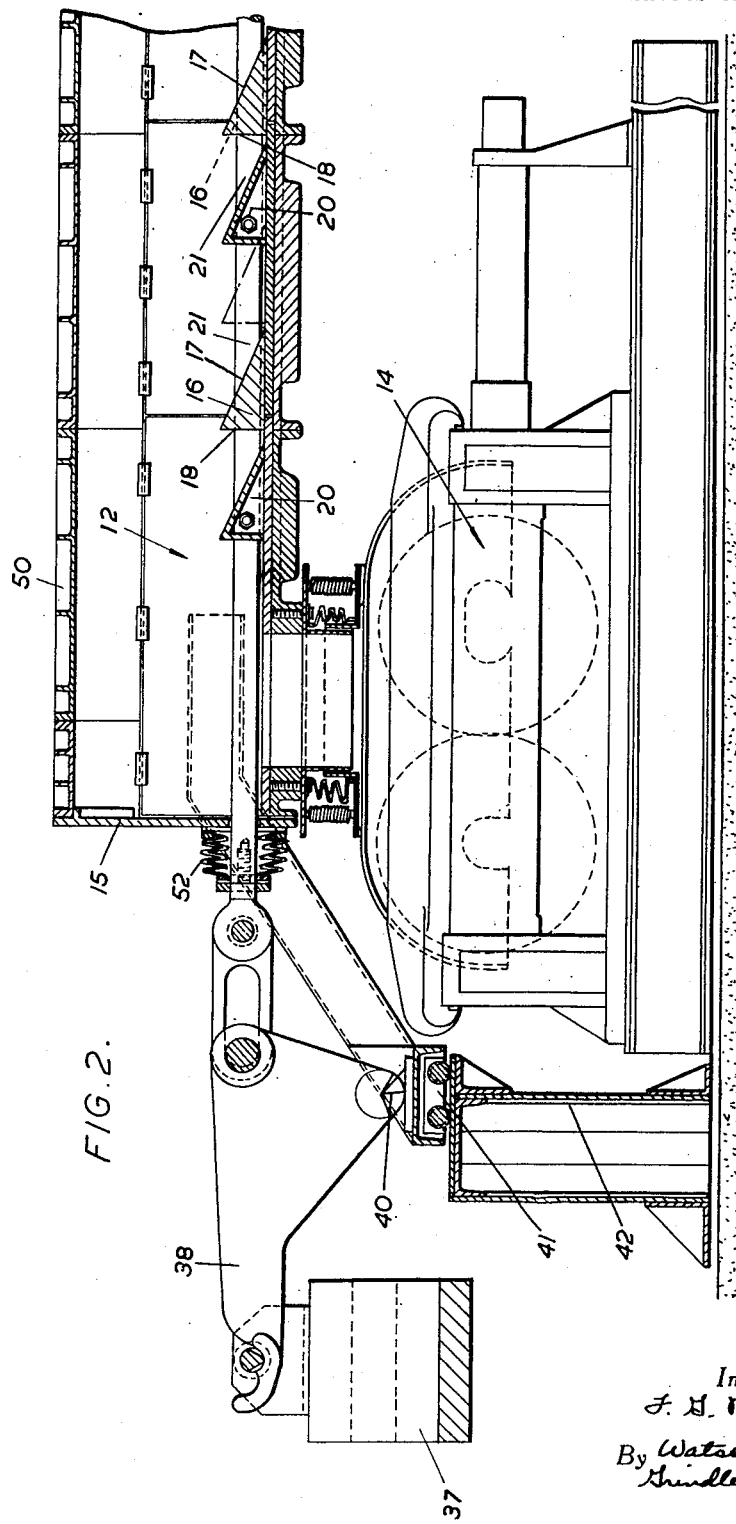
Figure 2 is a sectional side elevation of the delivery end portion of the conveyor.
Figure 3:
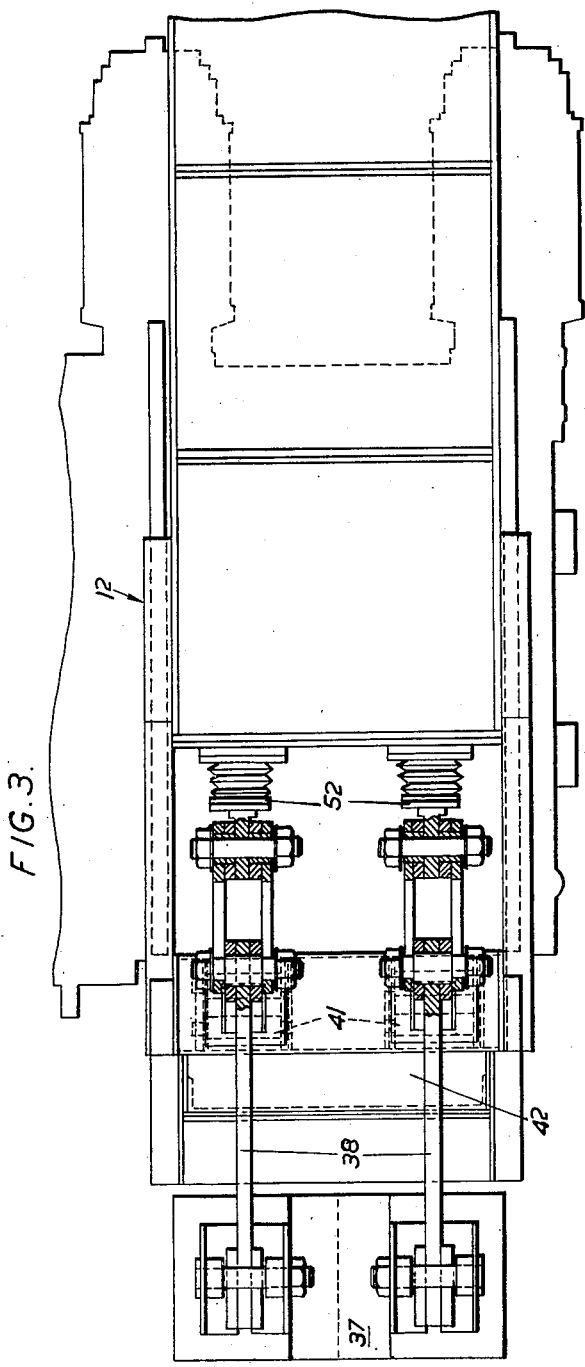
Figure 3 is a plan view of the part of the conveyor shown in Figure 2.
Figure 4:
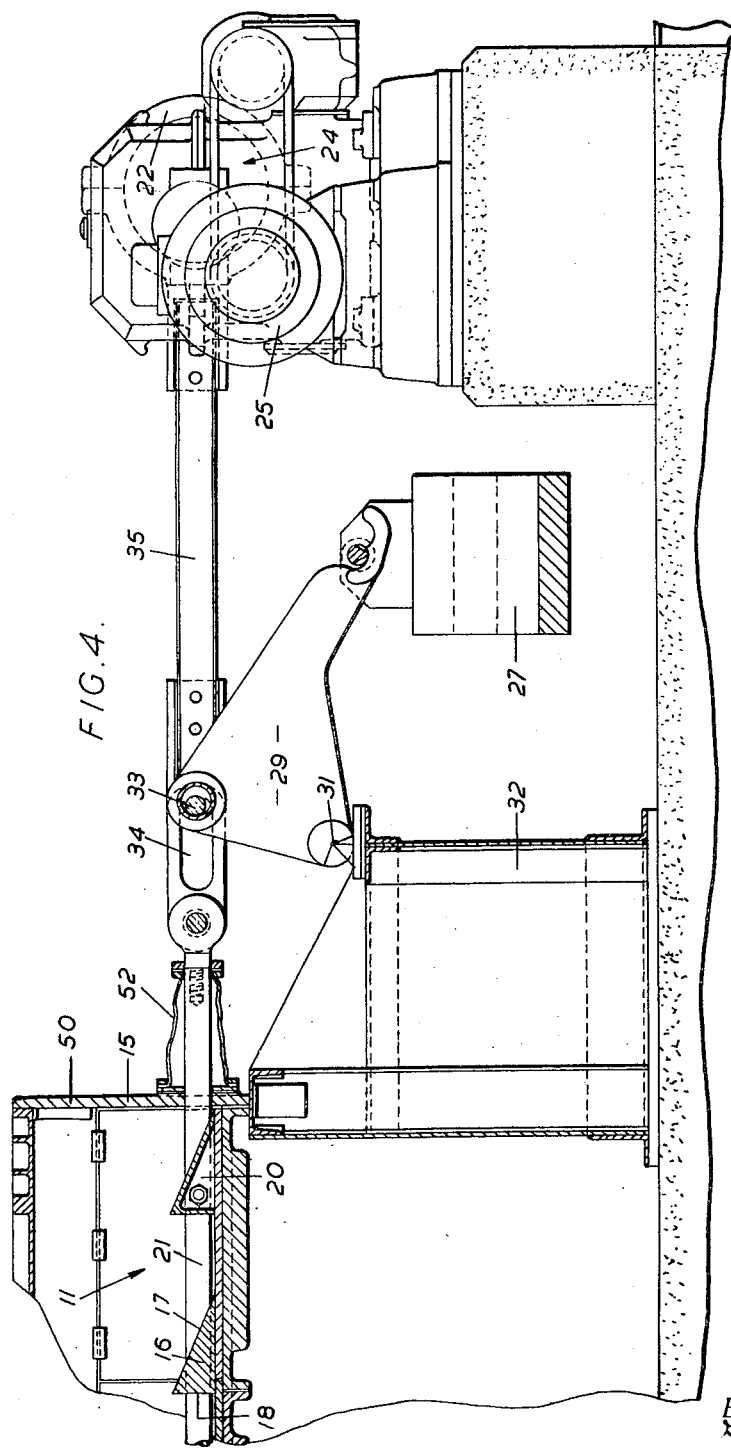
Figure 4 is a sectional side elevation of the receiving end portion of the conveyor and the driving mechanism therefor.

The conveyor is situated below a boiler outlet (not shown) situated above one end 11 of the conveyor. The conveyor carries ash and clinker to a crusher 14 situated below the other end 12 of the conveyor. Clinker falling into the ash conveyor, either from soot blowing or other causes is reduced to a small size in the crusher 14. The conveyor is substantially horizontal and comprises a track formed by a cast iron trough 15. Abutments 16 of triangular or wedge-shaped cross-section are fixed at equal intervals across the trough throughout the length of the conveyor, each having a ramped back 17 inclined upwardly, from the trough to the top of a vertical face 18, in the direction of motion of the ash i. e., from the boiler to the crusher. Similar movable pusher elements 20 (hereinafter referred to as pushers) are arranged alternately with the fixed abutments 16 and are secured at equal intervals by double-rods 21 to form a chain so that on moving the chain all the pushers 20 are moved together between two adjacent fixed abutments 16 respectively. The chain is connected to an eccentric 22 which when driven through a reduction gear unit 24 by an electric motor 25, moves the chain and pushers with a reciprocating motion. At the driving and receiving end 11 of the conveyor a heavy balance weight 27 is supported upon two lever arms 29, pivoted on knife edges 31 on a fixed support 32. The other ends of the lever arm are connected to a pin 33 slidable in slots 34 in connecting link rods at the end of the chain. The pin 33 is reciprocated by a connecting rod 35 from the eccentric 22. At the other end 12 of the conveyor a heavy balance weight 37 is supported upon two lever arms 38 pivoted upon knife edges 40 mounted on wheeled carriages 41 movable over a fixed support 42 in the longitudinal direction of the conveyor. The balance weights and lengths of the lever arms at each end of the chain are of equal magnitude and are chosen to maintain the chain in tension when loaded throughout its length.

In operation the eccentric 22 will lift the balance weight 27 thus permitting the balance weight 37 at the far end of the conveyor to overcome the frictional forces and inertia exerted by the movable parts of the conveyor and move each of the pushers 20 towards the next fixed abutment 16. On the return stroke the driving mechanism will overcome the frictional force and inertia and hence move each of the pushers 20 back again towards their other adjacent fixed abutments 16. At the same time the balance weight 27 nearer to the driving mechanism will cancel the effect of the balance weight 37 at the far end of the conveyor. During normal operation the pin 33 driven by the connecting rod 35 is maintained, by the balance weight 37 against the ends nearer to the driving mechanism of the slots 34; but in the event of the pushers or chain links jamming e. g., by large pieces of clinker, the pin 33 is pushed freely by the connecting rod 35 towards the other end of the slots 34. This arrangement prevents damage to the driving mechanism.

The speed of the movable parts is low, the eccentric only making a few revolutions a minute. As each pusher moves slowly towards and away from an associated fixed abutment the boiler refuse is gradually moved over the conveyor. When the trough has been covered by a layer of the boiler refuse, the boiler refuse will move in a gradual wave-like motion, due to the vertical faces of each of the pushers moving the material forwards towards the sloping faces 17 of the fixed abutments.

After leaving the conveyor the boiler refuse passes through the crusher 14 and is then fed via a rotary valve 43 into an air conveyance system, where it is conveyed by a straight pipe 44 into a main storage hopper (not shown). The crusher may be by-passed, during cleaning or repair, by using an emergency chute 46 in the trough of the conveyor. Any heavy material which is not carried upwards by the air blast in the pipe 44 to the main ash hopper is collected in a hopper 47 for discharge into a wagon 48. The conveyor is completely enclosed with covers 50, easily removable for inspection or repair, except at the entry from the boiler where the conveyor is open. Here the conveyor trough 15 is connected directly to the lower extremity of the boiler combustion chamber by an outet hopper which may be provided with walls so arranged as to avoid radiant heat, these walls may be water cooled by circulating water through tubes inserted in the walls. The boiler outlet is not shown in the drawings. The connecting links at each end of the chain pass through collapsible dust covers 52, of canvas or asbestos cloth, at the outlets from the cast-iron trough 15.

The conveyor may be placed near the ground level or may be raised to provide clear floor space. It may be of any suitable length and may be driven at the receiving end as described or at any other convenient point.

The conveyor may also be used for any material other than boiler refuse, the operating speed could then be chosen to suit that particular material.

I claim:

1. In a conveyor for loose material in bulk, such as ash or clinker, and of the type comprising a track defining a path along which the material is to be conveyed, a number of fixed bridge form abutments upstanding from the track and spaced apart along its length, and a number of pushers spaced apart along the length of the track and located in the gaps between successive abutments, the combination of a power-driven reciprocating member located at one end of the track and movable positively in both directions in alignment with the track, connecting rods extending along the track and attached to the pushers to constitute with them a unit movable in the track, a lost-motion coupling between the power-driven reciprocating member and the adjacent end of the pusher unit, two balance weights of equal effective magnitude, and two levers each fulcrumed between its ends and coupled at one end to the respective balance weight and at the other end operatively attached to the adjacent end of the pusher unit, in such manner as to maintain said pusher unit in tension throughout its length.

2. In a conveyor for loose material in bulk, such as ash or clinker, and of the type comprising a track defining a path along which the material is to be conveyed, a number of fixed bridge form abutments upstanding from the track and spaced apart along its length, and a number of pushers spaced apart along the length of the track and located in the gaps between successive abutments, the combination of a power-driven reciprocating member located at one end of the track and movable positively in both directions in alignment with the track, connecting rods extending along the track and attached to the pushers to constitute with them a unit movable in the track, two balance weights of equal effective magnitude, and combined with each balance weight a lever fulcrumed between its ends, coupled at one end to the balance weight and at its other end coupled through a pin-and-slot connection with the adjacent end of the pusher unit, whereby said pusher unit is maintained in tension throughout its length, said pin-and-slot connection acting as a lost-motion device.

3. In a conveyor for loose material in bulk, such as ash or clinker, and of the type comprising a track defining a path along which the material is to be conveyed, a number of fixed bridge form abutments upstanding from the track and spaced apart along its length, and a number of pushers spaced apart along the length of the track and located in the gaps between successive abutments, the combination of a power-driven reciprocating member located at one end of the track and movable positively in both directions in alignment with the track, connecting rods extending along the track and attached to the pushers to constitute with them a unit movable in the track, a lost-motion coupling between the power-driven reciprocating member and the adjacent end of the pusher unit, two balance weights of equal effective magnitude operatively attached to opposite ends respectively of the pusher unit in such manner as to maintain that unit in tension throughout its length, said operative attachment of that balance weight nearer to the reciprocating member comprising a lever fulcrumed between its ends, coupled at one end to said balance weight and at its other end coupled through a pin-and-slot connection with the pusher unit.

References Cited in the file of this patent

UNITED STATES PATENTS

| | | |
|---|---|---|
| 882,976 | Suess | Mar. 24, 1908 |
| 1,466,018 | Hepburn | Aug. 28, 1923 |
| 2,345,207 | Mansfield | Mar. 28, 1944 |
| 2,432,852 | Arvidson | Dec. 16, 1947 |
| 2,592,010 | Cole et al. | Apr. 8, 1952 |